T. BRYANT.
DEMOUNTABLE RIM FOR AUTOMOBILE TIRES.
APPLICATION FILED AUG. 1, 1916.
1,249,018.
Patented Dec. 4, 1917.
2 SHEETS—SHEET 1.
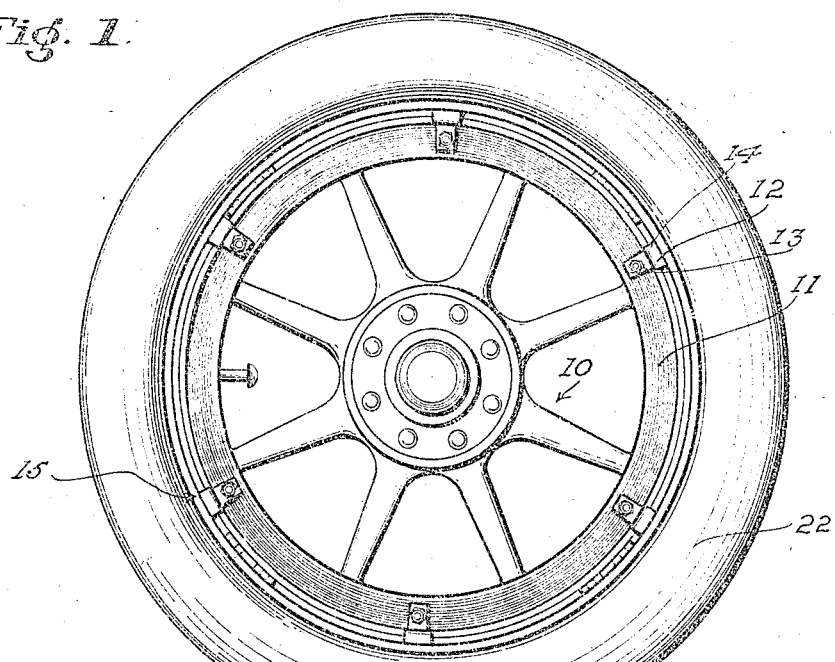
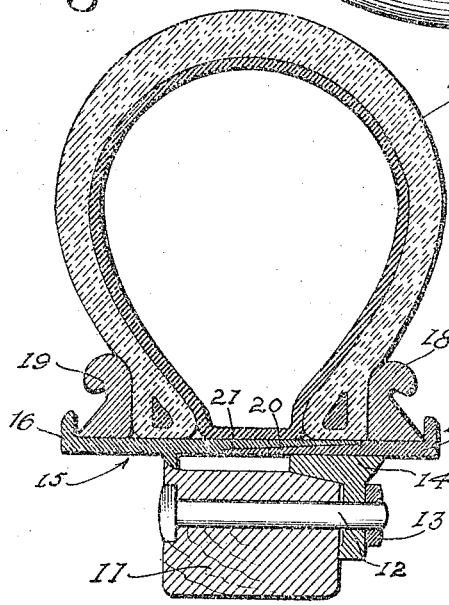
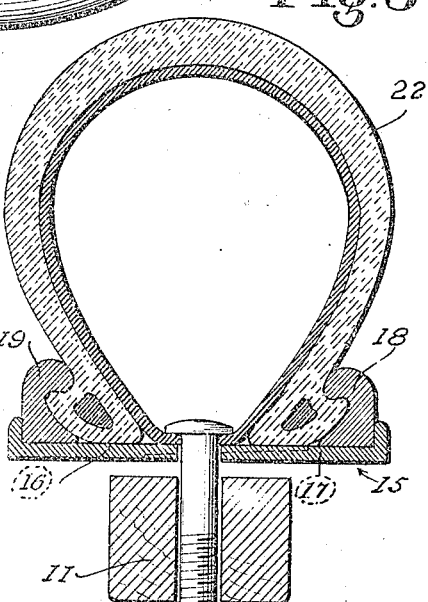
INVENTOR
Thomas Bryant
by
Hazard Berry & Miller
ATTYS.

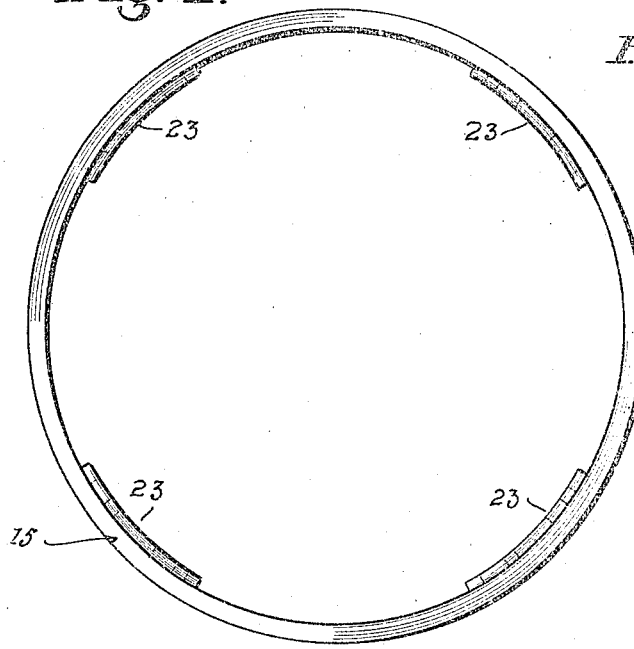
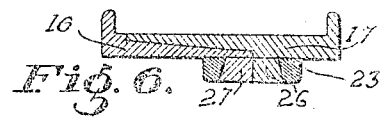
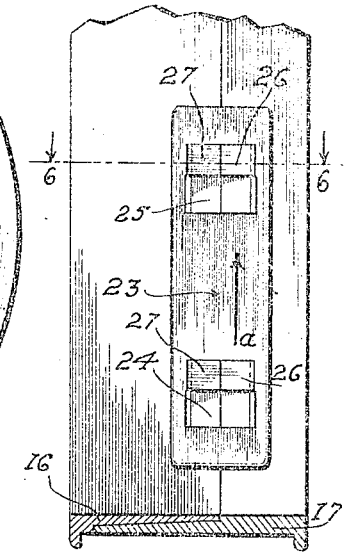
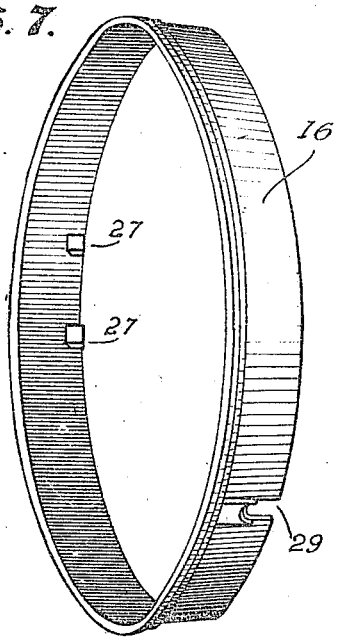
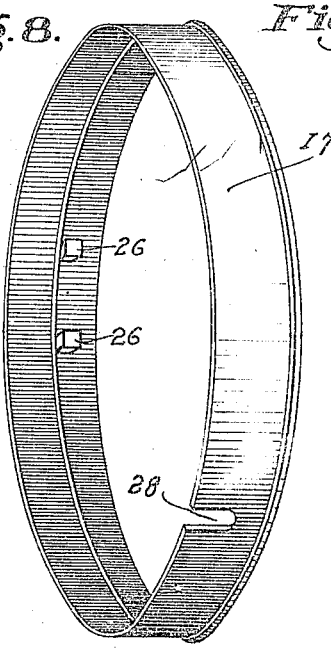

UNITED STATES PATENT OFFICE.

THOMAS BRYANT, OF SANTA MONICA, CALIFORNIA.

DEMOUNTABLE RIM FOR AUTOMOBILE-TIRES.

1,249,018. Specification of Letters Patent. Patented Dec. 4, 1917.

Application filed August 1, 1916. Serial No. 112,547.

*To all whom it may concern:*

Be it known that I, THOMAS BRYANT, a citizen of the United States, residing at Santa Monica, in the county of Los Angeles and State of California, have invented new and useful Improvements in Demountable Rims for Automobile-Tires, of which the following is a specification.

This invention relates to a rim for vehicle wheels and particularly pertains to a demountable rim for pneumatic tires for use upon automobile wheels.

It is an object of this invention to provide a demountable tire rim which affords easily operated means for positioning a pneumatic tire thereupon and for removing the same without damage to the tire or tire stem.

Another object of this invention is to provide a demountable rim which will not require that the tire casing be stretched to place in position thereover and thus eliminates the use of specially constructed tire tools and the inconvenience incident to their use.

It is another object to provide a demountable rim which may be simply and readily converted for use either with a straight bead tire case or a case having the customary clencher beads engaging opposite sides of the inner periphery of the tire.

Another object is to provide a device of the above class which is so designed and constructed as to be interchangeable with tire rims of the ordinary construction and to be mounted upon the wheel felly with the same facility.

A further object is to provide locking means for securing the component parts of the tire rim in position, which means may be operated without special tools and will, when locked, remain in their locked position, until wilfully removed.

Other objects will appear hereinafter.

The invention is illustrated, by way of example, in the accompanying drawings, in which:

Figure 1 is a view in side elevation illustrating an automobile wheel and showing it with a pneumatic tire mounted upon the demountable rim with which this invention is concerned.

Fig. 2 is a view in vertical section taken transversely of the tire and felly as shown in Fig. 1 of the drawings, and illustrates the rim as arranged for the mounting of a straight bead tire casing.

Fig. 3 is a view in transverse vertical section similar to Fig. 2 except that the rim is adapted for use with clencher tire casings.

Fig. 4 is a view in side elevation illustrating the rim as assembled and showing the disposition of the locking members therearound.

Fig. 5 is an enlarged view in elevation and section illustrating the manner in which the complementary elements of the rim are locked together.

Fig. 6 is a view in section as seen on the line 6—6 of Fig. 5 viewed in the direction of the arrows and illustrates the manner in which the locking member secures the component parts of the tire rim together.

Fig. 7 is a view in perspective disclosing the construction of the male rim member.

Fig. 8 is a view in perspective disclosing the construction of the female rim member and the provision for the reception of the tire stem.

Referring more particularly to the drawings, 10 indicates a vehicle wheel constructed with a felly 11 of common design. The felly is provided with rim clamping bolts 12 having nuts 13 adapted to hold clamping lugs 14 in their position as disposed around the wheel felly. The lugs 14, when in position, wedge beneath and rigidly support a demountable tire rim 15 with which the present invention is concerned.

The rim 15 is composed of an annular male body member 16 and an annular female body member 17 which interlock with each other and form the rim proper. The two body members 16 and 17 are formed with peripheral flanges upon opposite sides and are thus adapted to retain loose fitting clencher rings 18 and 19 by which the tire is engaged and secured upon the rim.

The body member 16 is formed with an annular tapered portion 20 which diverges from the inner edge of the member to a point adjacent the inner edge of the clencher ring 18. This portion is adapted to be pressed into an internally tapered portion 21 formed upon the inner edge of the female member 17 and terminates at a point adjacent the inner edge of the ring 18. In this manner the inner edges of the two body members 16 and 17 overlap each other and bear against each other to form a rigid assembled rim having a continuous outer perimeter for the seating of a tire 22 thereupon. The tire 22, as shown in Fig. 2, is formed with straight bead portions which are engaged by perpendicularly extending inner walls of the clencher rings 18 and 19 and are there held by the pressure of the edge flanges of the component body members. In Fig. 3 of the drawings, the tire is shown as having outwardly extending clencher beads which are engaged by the inturned flanges of the clencher rings 18 and 19, the rings having been inverted from the position shown in Fig. 2. In this manner the rim is adapted to be readily conformed for use with either straight or clencher casings.

The clencher rings 18 and 19 are held against the sides of the tire 22 by the body members 16 and 17 which in turn are locked in position by means of slidable locking plates 23. The locking plates 23 are arcuate and conform to the inner periphery of the rim and are formed with slots 24 and 25 which are adapted to pass over lugs 26 and 27, preferably formed integral with the body members 16 and 17, respectively. These lugs are positioned along the adjacent inner edges of the members 16 and 17 and are formed with straight adjacent walls and inwardly tapered outer walls so that when they are together they will combine to form a dove-tail member around which a complementary V-portion of the openings 24 and 25 is adapted to be wedged. In this manner the two component parts of the rim are positively held together and may readily be separated. A series of sets of lugs 26 and 27 are formed around the rims at equal distances from each other and thus adequately bind the rim parts together.

As a means for preventing the straining of the tire stem mounting within the tire tube when the tire is placed upon the rim, a stem slot 28 is formed within the member 16 and a stem slot 29 is formed within the member 17 and the two are adapted to pass around the stem from opposite sides and allow it to assume its proper position without danger of damaging the tire tube.

In the operation, the clencher rings are first positioned with their proper faces toward the tire body and the tire is then slipped upon the body member 17, after which the member 16 is forced into place within the member 17 and the clencher rings are properly drawn against the opposite sides of the tire casing. After this, the locking plates 23 are slipped over each set of lugs 26 and 27 and moved in the direction indicated by the arrow —a— in Fig. 5. This will bring the tapered side walls of the openings 24 and 25 into engagement with the taper walls of the lugs 26 and 27 and will thus hold the component rim members 16 and 17 against separation. After the tire has been mounted upon the rim and locked, it may be placed into a position upon the wheel felly and there secured by any preferred form of clamping lugs.

I call especial attention to the body of the rim comprising two complementary annular bands partly overlapping and wedging together, mating dove-tail lugs extending inwardly from the bands on opposite sides of the inner parting line, and locking plates fitting against the inner faces of the bands and having recesses through which the dove-tail lugs will pass and having dove-tail extension recesses in which the dove-tail lugs will wedge and lock by moving the plates circumferentially in the bands.

It will thus be seen that the tire rim here provided is readily operated and allows a tire to be positioned upon it without undue strain to any of the parts and further insures that any type of tires may be mounted thereon without alteration.

I claim:

1. In a demountable rim for pneumatic tires, two complementary annular bands partly overlapping and wedging together, mating dove-tail lugs extending inwardly from the bands on opposite sides of the inner parting line, and locking plates fitting against the inner faces of the bands and having recesses through which the dove-tail lugs will pass and having dove-tail extension recesses in which the dove-tail lugs will wedge and lock by moving the plates circumferentially in the bands so as to hold the complementary bands rigidly together.

2. In a demountable rim, two complementary annular bands oppositely tapered, the taper of one band fitting and wedging within the taper of the other band, there being notches for the tube of the pneumatic tire, mating dove-tail lugs extending inwardly from the bands on opposite sides of the inner parting line, and locking plates fitting against the inner faces of the bands and having recesses through which the dove-tail lugs will pass and having dove-tail extension recesses in which the dove-tail lugs will wedge and lock by moving the plates circumferentially in the bands.

In testimony whereof I have signed my name to this specification.

THOMAS BRYANT.